US011490233B2

(12) United States Patent
Miranda

(10) Patent No.: US 11,490,233 B2
(45) Date of Patent: Nov. 1, 2022

(54) WIRELESS SERVICE PROVIDER SYSTEM AND PROCESS FOR PROVIDING CUSTOMIZABLE WIRELESS SERVICE FOR A WIRELESS DEVICE

(71) Applicant: TracFone Wireless, Inc., Miami, FL (US)

(72) Inventor: Nestor Miranda, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 0 days.

(21) Appl. No.: 17/114,874

(22) Filed: Dec. 8, 2020

(65) Prior Publication Data

US 2021/0092570 A1  Mar. 25, 2021

Related U.S. Application Data

(63) Continuation of application No. 16/508,547, filed on Jul. 11, 2019, now Pat. No. 10,863,326.

(Continued)

(51) Int. Cl.
*H04W 4/24* (2018.01)
*H04M 15/00* (2006.01)
*H04W 48/02* (2009.01)
*H04W 8/18* (2009.01)
*H04M 17/00* (2006.01)

(52) U.S. Cl.
CPC ............. *H04W 4/24* (2013.01); *H04M 15/58* (2013.01); *H04M 15/715* (2013.01); *H04M 15/73* (2013.01); *H04M 17/35* (2013.01); *H04W 8/18* (2013.01); *H04W 48/02* (2013.01)

(58) Field of Classification Search
CPC ......... H04W 4/24; H04W 12/06; H04W 8/18; H04W 24/02; H04W 12/00; H04W 4/12; H04W 8/183; H04W 4/00; H04W 72/02; H04W 48/02; H04M 2203/301; H04M 2203/551; H04M 3/42221; H04M 15/80; H04M 15/39; H04M 15/41; H04M 15/58; H04M 15/61; H04M 15/88; H04M 15/64; H04M 15/68; H04M 15/8083; H04M 15/853; H04M 15/854; H04M 15/73; H04M 15/715; H04M 17/35; H04M 15/8022; G06Q 20/102; G06Q 20/20; G06Q 20/40;

(Continued)

(56) References Cited

U.S. PATENT DOCUMENTS 7,286,655 B2   10/2007  Voorman et al.
8,594,626 B1 * 11/2013  Woodson .......... H04M 15/8355
                                                      379/114.03

(Continued)

OTHER PUBLICATIONS

"Build Your Own Plan" by Tello, archived on Feb. 6, 2018 (Year: 2018) [Cited in related U.S. Appl. No. 16/508,547].

*Primary Examiner* — Daniel Lai

(57) ABSTRACT

A wireless service provider system for authorizing wireless service on a wireless device includes a backend system. The backend system configured receive a request for the wireless service along with a monetary value of the wireless service in any requested amount from the connected device, receive a payment authorization or a verification of payment for the wireless service in the requested amount from the connected device, and receive a request from the connected device for allocating the wireless service.

20 Claims, 8 Drawing Sheets

Related U.S. Application Data

(60) Provisional application No. 62/696,405, filed on Jul. 11, 2018.

(58) Field of Classification Search
CPC .... G06Q 30/0283; G06Q 30/04; G06Q 40/12; H04L 12/14
See application file for complete search history.

(56) References Cited

U.S. PATENT DOCUMENTS

| | | |
|---|---|---|
| 2003/0050041 A1 | 3/2003 | Wu |
| 2008/0166993 A1 | 7/2008 | Gautier et al. |
| 2013/0132854 A1 | 5/2013 | Raleigh et al. |
| 2015/0381826 A1* | 12/2015 | Marimuthu ......... H04M 15/887 455/405 |
| 2016/0142559 A1 | 5/2016 | Pollak |
| 2016/0192184 A1 | 6/2016 | Salihi |

\* cited by examiner

WIRELESS SERVICE PROVIDER SYSTEM AND PROCESS FOR PROVIDING CUSTOMIZABLE WIRELESS SERVICE FOR A WIRELESS DEVICE

CROSS-REFERENCE TO RELATED APPLICATIONS

This application is a continuation of U.S. application Ser. No. 16/508,547, filed Jul. 11, 2019, now U.S. Pat. No. 10,863,326, issued Dec. 8, 2020, which is hereby incorporated by reference in its entirety for all purposes as if fully set forth herein, which application claims the benefit of U.S. Provisional Application No. 62/696,405 filed on Jul. 11, 2018, which is hereby incorporated by reference in its entirety for all purposes as if fully set forth herein.

BACKGROUND OF THE DISCLOSURE

1. Field of the Disclosure

The disclosure relates to a wireless service provider system and process for providing customizable wireless service for a wireless device. More particularly, a wireless service provider system and process for providing customizable wireless service for a wireless device in user customizable amounts and wireless service type quantities.

2. Related Art

A large number of wireless service plans exist for customers desiring wireless services such as data, talk, and text messaging. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNOs) that maintain and control their own wireless networks. A MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data, number of voice minutes, and number of text messages used.

The wireless services provided by the MVNOs often implement activation cards, also known as airtime cards, for the sale of wireless service, e.g. voice call service, data service, or text messaging service. Airtime cards typically have preset amounts of text, data, service days, and/or minutes. Airtime cards generally include a unique code that may include a scratch off area obscuring the unique code. Once a card is sold to a user, the user must manually scratch off the covering of the code and manually enter the code in order to obtain the addition of wireless service or activation of wireless service.

Presently, there are several problems with purchasing airtime cards. First, the airtime cards typically have a preset minimum value (e.g. $20) and certain customers may not be able to afford this preset minimum value. Second, customers may need more of a particular one of text, data, service days, and/or minutes as opposed to purchasing all four in a preset amount. Additionally, having a multitude of pre-set cards takes up retail hangtag space to sell cards having various monetary values (e.g., $20 cards, $30 cards, $50 cards, and so on). Finally, the MVNO must produce and track all of the pre-set cards at the various monetary values. MNOs similarly have predefined wireless service plans having only minimal flexibility.

Accordingly, a more convenient flexible approach is needed for the sale and allocation of wireless services.

SUMMARY OF THE DISCLOSURE

Convenience, timeliness, and reliability of the wireless providers' are key factors that play into a user's experience. By developing a system to improve at least these factors, a more positive experience can be provided to the user. The improved experience will help retain customer base and increase the amount of customers willing to purchase wireless services from MNOs and MVNOs. In order to do so, the following needs can be addressed by enabling new improved systems that can be implemented for the distribution of a wireless service.

The foregoing needs are met, to a great extent, by the disclosure, providing a system and associated methods for procuring wireless service on wireless devices and/or systems implementing a user cost definable amount of wireless service that may further be user customizable for the types of desired wireless service. In particular, the disclosure is intended to solve the challenges of using preset monetary values and associated preset amounts of wireless service. According to some aspects of the disclosure, the wireless services may include at least one of voice call service, data service, text messaging service, and service days.

According to aspects of the disclosure, a wireless service provider system for authorizing wireless service on a wireless device includes a backend system configured to be in communication with a connected device; the backend system further configured to receive a request for the wireless service along with a monetary value of the wireless service in any requested amount from the connected device; the backend system further configured to receive a payment authorization or a verification of payment for the wireless service in the requested amount from the connected device; the backend system further configured to receive a request from the connected device for allocating the wireless service, the request for allocating the monetary value of the wireless service comprising an amount of data service, an amount of text service, an amount of voice service, and an amount of service days; the backend system further configured to provision the wireless service through a wireless service provider, the wireless service comprising the amount of data service, the amount of text service, the amount of voice service, and the amount of service days; a metering system configured to monitor a use of the wireless service provided by the wireless service provider used by the wireless device; and the metering system further configured to control the use of the wireless service provided by the wireless service provider used by the wireless device, wherein the connected device comprises at least one of the following: a point-of-sale terminal, the wireless device, or an Internet-enabled device.

According to further aspects of the disclosure, a wireless service provider process for authorizing wireless service on a wireless device includes providing a backend system configured to be in communication with a connected device;

receiving a request in the backend system for the wireless service along with a monetary value of the wireless service in any requested amount from the connected device; receiving in the backend system a payment authorization or a verification of payment for the wireless service in the requested amount from the connected device; receiving in the backend system a request from the connected device for allocating the wireless service, the request for allocating the monetary value of the wireless service comprising an amount of data service, an amount of text service, an amount of voice service, and an amount of service days; provisioning with the backend system the wireless service through a wireless service provider, the wireless service comprising the amount of data service, the amount of text service, the amount of voice service, and the amount of service days; monitoring with a metering system a use of the wireless service provided by the wireless service provider used by the wireless device; and controlling with the metering system further configured to control the use of the wireless service provided by the wireless service provider used by the wireless device, wherein the connected device comprises at least one of the following: a point-of-sale terminal, the wireless device, or an Internet-enabled device.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
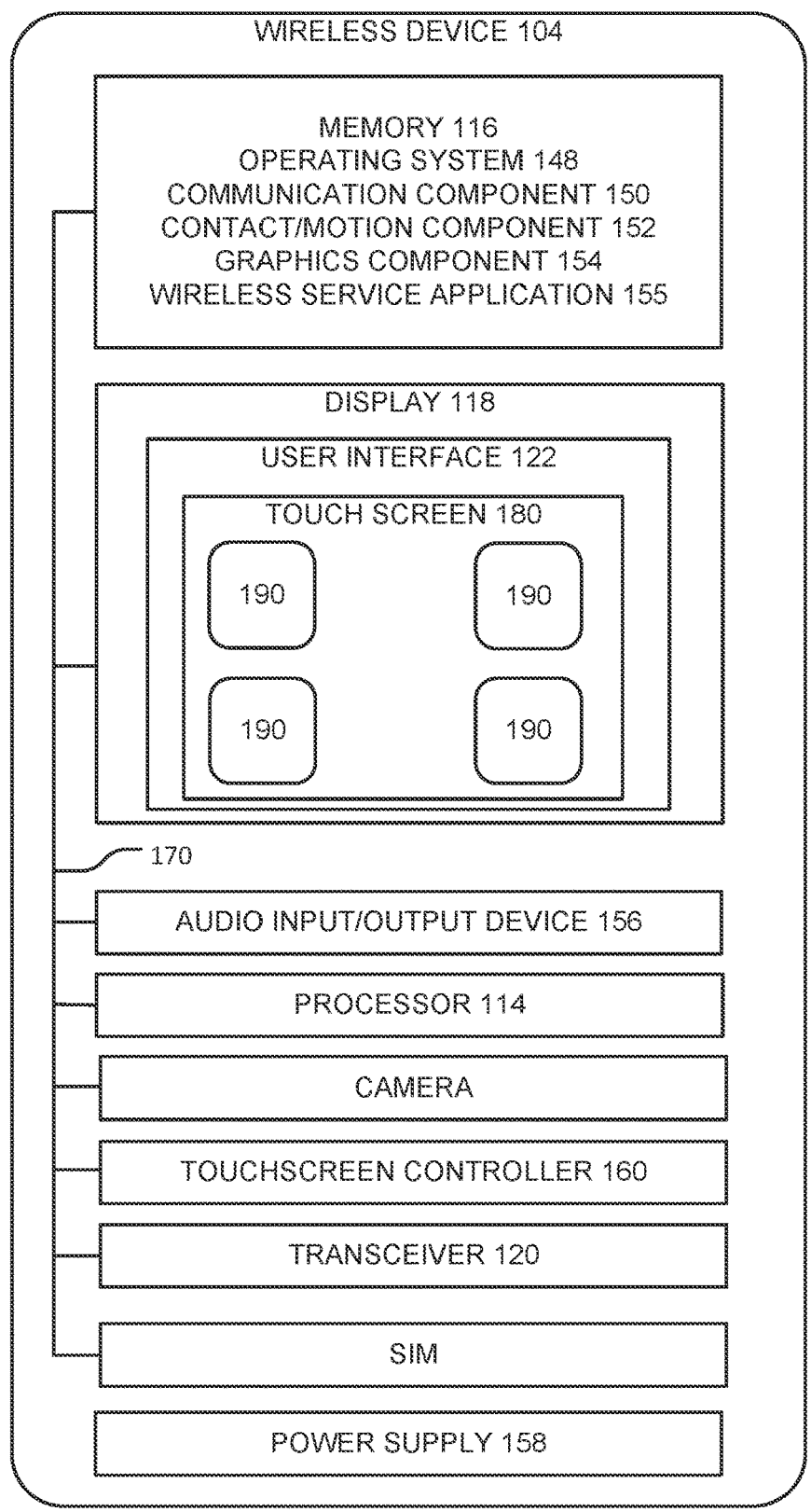
FIG. 1 illustrates a block diagram of a wireless device with exemplary components in accordance with aspects of the disclosure.

In this specification and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone." With respect to remote alert devices, data transmission over a wireless network, including on a pre-paid basis is contemplated for alarm fobs, wireless remote camera devices, vehicle monitoring systems, home based security systems that do not require a landline or use both a landline and a wireless network for added reliability, and similar systems. The vehicle monitoring system may include a vehicle communication interface, components to determine vehicle operation, and/or the like. The home based security system may include door sensors, window sensors, motion detectors, interface devices, and/or the like.

A "point-of-sale" terminal as used herein can refer to a location where one or more wireless devices and/or services can be sold and/or activated which may or may not require sales personnel. A point-of-sale terminal can include, for example, a vending machine, an automated kiosk, a retail store, a convenience store, a gas station, and the like.

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 5G network, that may utilize the teachings of the present application to sell, activate, monitor, redeem, and/or track, the activation of one or more wireless services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

FIG. 1 illustrates a block diagram of a wireless device with exemplary components in accordance with aspects of the disclosure.

The wireless device 104 may include a processor 114, a memory 116, a transceiver 120, and a graphical user interface (GUI) 122. The processor 114 may be a central processing unit configured to execute instructions such as instructions related to software programs. Any processor can be used for the electronic device as understood to those of ordinary skill in the art. In one aspect, the processor 114 may be a microprocessor, chipset, or the like.

The display 118 may be a liquid crystal display (LCD), light-emitting diode (LED) display, or the like. The display 118 may include a backlight to illuminate the various color liquid crystals to provide a more colorful display. The graphical user interface (GUI) 122 may be any type of physical input as readily employed in the field. For example, the graphical user interface (GUI) 122 may have physical buttons. Alternatively, the graphical user interface (GUI) 122 may be implemented on a touchscreen 180, a motion sensor (not shown), and the like. Finally, the wireless device 104 may include a power supply 158, a camera, and in some aspects a SIM (subscriber identity module or subscriber identification module).

The memory 116 of the wireless device 104 may further include an operating system 148, a communication component 150, a contact/motion component 152, a graphics component 154, and the like. The operating system 148 together with the various components provides software functionality for each of the components of the wireless device 104. The memory 116 may include a high-speed, random-access memory. Also, the memory 116 may be a non-volatile memory, such as magnetic fixed disk storage, SIM, UICC, cloud-based memory, flash memory or the like. These various components may be connected through various communication lines including a data bus 170.

The wireless device 104 can include an audio input/output device 156. The audio input/output device 156 may include speakers, speaker outputs, and the like, providing sound output; and may include microphones, microphone inputs, and the like, for receiving sound inputs. In an exemplary aspect, the audio input/output device 156 may include an analog to digital converter and a digital to audio converter for audio input and output functions respectively.

The transceiver 120 and/or the processor 114 may provide radio and signal processing as needed to access a wireless network for services by communication channel as defined herein. The transceiver 120 and/or the processor 114 may be configured to process call functions, data transfer, and the like and provide an array of services, based on those functions, to the user.

In an exemplary aspect, the touchscreen 180 of the disclosure may be implemented in the display 118 and may detect a presence and location of a touch of a user within the display area. For example, touching the display 118 of the wireless device 104 with a finger or hand. The touchscreen 180 may also sense other passive objects, such as a stylus. Additionally, the wireless device 104 may further include a touch screen controller 160.

In one operation, the display 118 may show various objects 190 associated with applications for execution by the processor 114. For example, a user may touch the display 118, particularly the touchscreen 180, to interact with the objects 190. That is, touching an object 190 may execute an application in the processor 114 associated with the object 190 that is stored in memory 116. Additionally or alternatively, touching an object 190 may open a menu of options to be selected by the user. The display 118 may include a plurality of objects 190 for the user to interact with. Moreover, the display 118 may include a plurality of screens. The display 118 showing one screen at a time. The user may interact with the display 118 to move a screen into view on the display 118. Various objects 190 may be located in each of the screens.

The touchscreen 180 may be implemented as a resistive touchscreen, a surface acoustic wave touch screen, a capacitive touchscreen, self-capacitance sensors, infrared sensors, dispersive signal technology, acoustic pulse recognition, or the like.

The display 118 is generally configured to display a graphical user interface (GUI) 122 that provides an easy to use visual interface between a user of the wireless device 104 and the operating system or application(s) running on the wireless device 104. Generally, the GUI presents programs, files, and operational options with graphical images. During operation, the user may select and activate various graphical images displayed on the display 118 in order to initiate functions and tasks associated therewith or launch applications.

In another aspect of the disclosure, the memory 116 of the wireless device 104 can include a database for storing user information. The user information may include information such as full name, address, email address, contact number, credit card information, and the like. In one aspect, the database may include security questions. In another aspect, the database may include user specified preferences.

In yet another aspect of the application, the memory 116 of the wireless device 104 can include a wireless service application 155. The wireless service application 155 may be preinstalled, downloaded from an application store, or the like. The wireless service application 155 may be configured to control use of the wireless device 104 based on interaction with a wireless provider backend server (shown in FIG. 2) for monitoring a use of the wireless service. The wireless service application 155 may be executed by the processor 114, may be responsive to the graphical user interface (GUI) 122, may utilize a voice recognition software that may be responsive to voice commands, and the like.

The wireless service provided to the wireless device 104 by a wireless network may be monitored by an internal accounting module in the wireless device 104, by a metering device implemented by the wireless network (MNO and/or MVNO), by both the internal accounting module in the wireless device 104 and the metering device implemented by the wireless network, or the like. For brevity, each of the above-noted implementations, which are described in detail below, will be referred to as a metering system.

In one aspect, the wireless device 104 and/or a wireless service application 155 may utilize an internal accounting module to establish an account with a representation of prepaid funds or available credit for wireless services. In some aspects, the internal accounting module of the wireless device 104 and/or the wireless service application 155 may also be used to store and/or transmit a plurality of charge rates as well as a billing/payment algorithm. The internal accounting module can monitor and classify each wireless service used (data, voice, SMS, and service days) into one of a plurality of billing categories. Select a charge rate corresponding to that billing category. Calculate an appropriate charge for the data usage, voice usage, service days, service days, and SMS usage in real time by using the selected charge rate. Finally, apply this charge to a prepaid account. Thereafter, the resulting wireless service usage is debited from the prepaid account. Additionally, the amount in the prepaid account can be increased as described herein.

In other aspects, the wireless device 104 and/or a wireless service application 155 and the wireless network may form a hybrid system that together or individually monitor the wireless service utilized by the wireless device. In this regard, the hybrid system may store and/or transmit a plurality of charge rates as well as a billing/payment algorithm. The hybrid system can monitor and classify each wireless service used (data, voice, SMS, and service days) into one of a plurality of billing categories. Select a charge rate corresponding to that billing category. Calculate an appropriate charge for the data usage, voice usage, service days, and SMS usage in real time by using the selected charge rate. Finally, apply this charge to a prepaid account. In other words, the resulting wireless service usage is debited from the prepaid account. Additionally, the amount in the prepaid account can be increased as described herein. In this aspect, the disclosure may utilize the teachings of U.S. patent application Ser. No. 13/669,838, filed Nov. 6, 2012, titled Hybrid Network Based Metering Server and Tracking Client for Wireless Services by the assignee of the present disclosure, which is incorporated by reference in its entirety.

In yet other aspects, the wireless network may monitor the wireless service utilized by the wireless device. This aspect may be implemented in a MNO, MVNO, or both types of wireless networks. In this regard, the wireless network may store and/or transmit a plurality of charge rates as well as a billing/payment algorithm. The wireless network can monitor and classify each wireless service used (data, voice, SMS, and service days) into one of a plurality of billing categories. Select a charge rate corresponding to that billing category. Calculate an appropriate charge for the data usage, voice usage, service days, and SMS usage in real time by using the selected charge rate. Finally, apply this charge to a prepaid account. In other words, the resulting wireless service usage is debited from the prepaid account. Additionally, the amount in the prepaid account can be increased as described herein. In this aspect, the disclosure may utilize the teachings of U.S. patent application Ser. No. 15/215,985, filed Jul. 21, 2015, and titled System, Process And Device For Multiple Network Usage Tracking by the assignee of the present disclosure, which is incorporated by reference in its entirety.

In some aspects, once it is determined that the amount of wireless service (data, voice, service days, and/or SMS) used has depleted the account to zero, the processor 114 may interact with the internal accounting module and/or a wireless provider backend system to limit, prevent, alert the user, and/or control further use of the wireless device 104. In some aspects, once the wireless network determines that the amount of wireless service (data, voice, service days, and/or SMS) used has depleted the account to zero, the wireless provider backend system may limit, prevent, alert the user, and/or control further use of the wireless device 104 as further described herein.

The controlled use can include suspending voice calls, allowing limited voice calls, allowing all voice calls, suspending text messages, allowing limited text messages, allowing all text messages, suspending wireless data service, limiting wireless data service, throttling wireless data service, and allowing all wireless data service.

Figure 2:
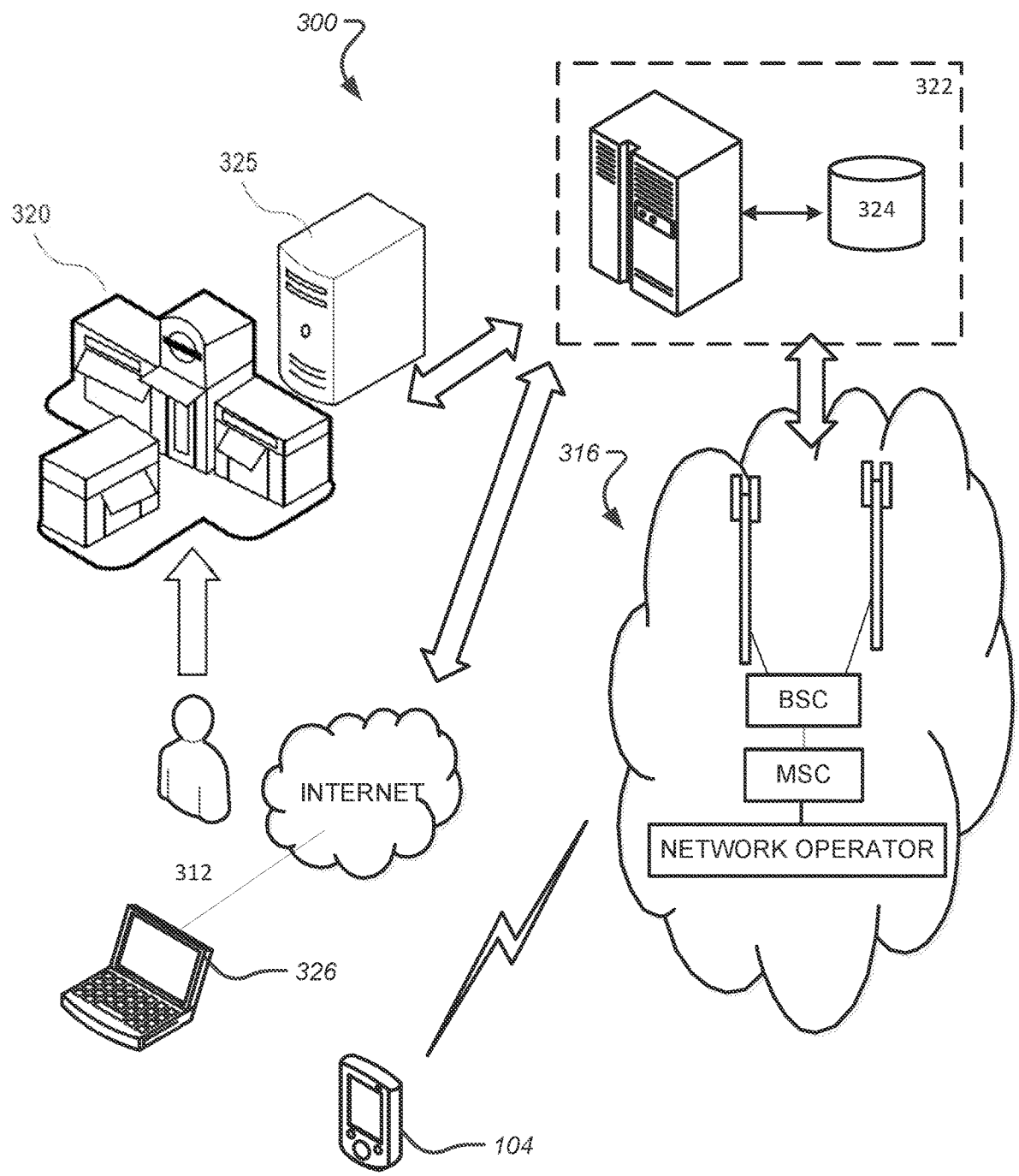
FIG. 2 illustrates a schematic diagram of an exemplary wireless service system in accordance with aspects of the disclosure.

FIG. 2 illustrates a schematic diagram of an exemplary wireless service provisioning system in accordance with aspects of the disclosure.

In particular, the wireless service provisioning system 300 can be used to purchase, procure, add, activate, and the like wireless services on a wireless device 104, which will be referred to as procuring wireless service for brevity hereinafter. In one aspect, the wireless service provisioning system 300 can be used to procure wireless services for a prepaid account of the wireless device 104.

The wireless user 312 may be able to procure wireless service by obtaining an airtime card at a point-of-sale terminal 320, by obtaining an airtime code at the point-of-sale terminal 320, by interacting with the wireless service application 155, by obtaining an airtime card procured through a web browser on the wireless device 104 or internet-enabled device 326, by obtaining an airtime code procured through a web browser from the wireless device 104 or internet-enabled device 326, and by interacting with a web browser from the wireless device 104 or internet-enabled device 326.

In each case, the wireless user 312 may be able to designate the dollar amount of wireless service desired. In this regard, the wireless user may be able to designate an amount of wireless service desired in any monetary amount. In other aspects, the wireless user may be able to designate an amount of wireless service desired in increments of dollars (e.g., $1, $2, $3 . . . $100). Moreover, the wireless user 312 may be able to designate what portion of the procured wireless service is allocated for voice call service, data service, text messaging service, service days, and the like. This approach gives the wireless user 312 great flexibility to obtain the desired wireless service consistent with their budget, needs, and so on.

For example, the wireless user 312 may be able to procure wireless service by obtaining an airtime card at the point-of-sale terminal 320. In this regard, the wireless user 312 may verbally instruct, manually input, and the like the desired monetary amount of wireless service to be procured. This monetary amount of wireless service may then be input into the communication system 325. Additionally, identifying information of the airtime card may be input into the communication system 325 as well. The identifying information may be an identification number listed on the airtime card. In one aspect, the identification number may be a bar code, QR code, or the like that is scanned at the point-of-sale terminal 320.

In one aspect, the wireless user 312 may verbally instruct, manually input, and the like the desired distribution of wireless service to be procured. In particular, what amount of voice call service, data service, text messaging service, and/or service days. Thereafter, the identification number, the monetary amount of wireless service, and a distribution of the wireless service may be transmitted from the communication system 325 of the point-of-sale terminal 320 to a wireless backend system 322. In other aspects, the wireless user 312 may subsequently designate the desired distribution of wireless service to be procured. The point-of-sale terminal 320 may include one or more of the various features of the wireless device 104 described in relation to FIG. 1. In this regard, the point-of-sale terminal 320 may be any type of computing device, such as, a desktop computer, personal computer, a laptop/mobile computer, a personal data assistant (PDA), a mobile phone, a tablet computer, cloud computing device, and the like, with wired/wireless communications capabilities via a communication channel as defined herein. In one or more aspects, the wireless backend system 322 may be implemented by a server. In one or more aspects, the communication system 325 may be implemented by a server.

In another aspect, the wireless user 312 may be able to procure wireless service by obtaining an airtime code at the point-of-sale terminal 320. In this regard, the wireless user 312 may verbally instruct, manually input, and the like the desired monetary amount of wireless service to be procured. This monetary amount of wireless service may then be input into the communication system 325.

In one aspect, the wireless user 312 may verbally instruct, manually input, and the like the desired distribution of wireless service to be procured. In particular, what amount of voice call service, data service, text messaging service, and/or service days. Thereafter, the identification number, the monetary amount of wireless service, and a distribution of the wireless service may be transmitted from the communication system 325 of the point-of-sale terminal 320 to a wireless backend system 322. In other aspects, the wireless user 312 may subsequently designate the desired distribution of wireless service to be procured.

In another aspect, the wireless user 312 may be able to procure wireless service by obtaining an airtime card or airtime code through a web browser. In this regard, the wireless user 312 may manually input the desired monetary amount of wireless service to be procured. This monetary amount of wireless service may then be transmitted to the wireless backend system 322. Thereafter, the airtime card may be delivered via mail to the wireless user 312 or the airtime code may be generated on screen in the web browser. In one aspect, the web browser may be implemented by the wireless device 104. In another aspect, the web browser may be implemented by the internet-enabled device 326. In this regard, the Internet-enabled device 326 may include one or more of the various features of the wireless device 104 described in relation to FIG. 1. In this regard, the internet-enabled device 326 may be any type of computing device, such as, a desktop computer, personal computer, a laptop/mobile computer, a personal data assistant (PDA), a mobile phone, a tablet computer, cloud computing device, and the like, with wired/wireless communications capabilities via the communication channels.

In one aspect, the wireless user 312 may manually input, and the like the desired distribution of wireless service to be procured. In particular, what amount of voice call service, data service, text messaging service, and/or service days. Thereafter, the identification number, the monetary amount of wireless service, and a distribution of the wireless service may be transmitted from the web browser to a wireless backend system 322. In other aspects, the wireless user 312 may subsequently designate the desired distribution of wireless service to be procured.

Thereafter, the wireless user 312 may utilize the airtime card/airtime code and an associated unique identifier or personal identification number (PIN) for procuring the desired wireless service. In this regard, the wireless user 312 may input the unique identifier into the wireless device 104 or the internet-enabled device 326 for transmission to the wireless backend system 322 for the provisioning of the previously purchased monetary amount of wireless service having the requested wireless service distribution.

In one aspect, the wireless user 312 may input the unique identifier into the wireless device 104 utilizing the wireless service application 155 that transmits the code to the wireless backend system 322. If the wireless user 312 has not yet indicated what amounts of voice call service, data service, text messaging service, and/or service days are desired, the wireless user 312 may now input those amounts into the wireless service application 155. Thereafter, the wireless backend system 322 may update the prepaid account of the wireless user 312 consistent with the amount of wireless service obtained and the particular distribution of wireless services.

In one aspect, the wireless user 312 may input the unique identifier into the wireless device 104 utilizing a web browser that launches a web portal implemented by the wireless backend system 322 that transmits the code to the wireless backend system 322. If the wireless user 312 has not yet indicated what amounts of voice call service, data service, text messaging service, and/or service days are desired, the wireless user 312 may now input those amounts into the web browser. Thereafter, the wireless backend system 322 may update the prepaid account of the wireless user 312 consistent with the amount of wireless service obtained and the particular distribution of wireless services.

In one aspect, the wireless user 312 may input the unique identifier into the wireless device 104 utilizing a text messaging application addressed to a designated short code that transmits the code to the wireless backend system 322. If the wireless user 312 has not yet indicated what amounts of voice call service, data service, text messaging service, and/or service days are desired, the wireless user 312 may now input those amounts into the text messaging application. In this regard, in some aspects, the wireless backend system 322 may send various text messages to the wireless user 312 confirming receipt of the unique identifier and inquiring as to a desired distribution of wireless services. Thereafter, the wireless backend system 322 may update the prepaid account of the wireless user 312 consistent with the amount of wireless service obtained and the particular distribution of wireless services.

In one aspect, the wireless user 312 may input the unique identifier into the internet-enabled device 326 utilizing a web browser that launches a web portal implemented by the wireless backend system 322 that transmits the code to the wireless backend system 322. If the wireless user 312 has not yet indicated what amounts of voice call service, data service, text messaging service, and/or service days are desired, the wireless user 312 may now input those amounts into the web browser. Thereafter, the wireless backend system 322 may update the prepaid account of the wireless user 312 consistent with the amount of wireless service obtained and the particular distribution of wireless services.

In one aspect, the wireless user 312 may input the unique identifier into the wireless device 104 during a phone call to an Interactive Voice Response (IVR) system implemented by the wireless backend system 322 to deliver the unique identifier to the wireless backend system 322. If the wireless user 312 has not yet indicated what amounts of voice call service, data service, text messaging service, and/or service days are desired, the wireless user 312 may now input those amounts into the IVR system. In this regard, in some aspects, the wireless backend system 322 may generate various voice messages to the wireless user 312 confirming receipt of the unique identifier and inquiring as to a desired distribution of wireless services. Thereafter, the wireless backend system 322 may update the prepaid account of the wireless user 312 consistent with the amount of wireless service obtained and the particular distribution of wireless services.

In another aspect, the wireless user 312 may be able to procure wireless service through a web browser. In this regard, the wireless user 312 may manually input the desired monetary amount of wireless service to be procured into the web browser. The web browser connecting to the wireless backend system 322 through a user account portal. This monetary amount of wireless service may then be transmitted to the wireless backend system 322. In this aspect, the wireless user 312 may manually input, and the like the desired distribution of wireless service to be procured. In particular, what amount of voice call service, data service, text messaging service, and/or service days. Thereafter, the wireless backend system 322 may update the prepaid account of the wireless user 312 consistent with the amount of wireless service obtained and the particular distribution of wireless services.

In another aspect, the wireless user 312 may be able to procure wireless service through the wireless service application 155. In this regard, the wireless user 312 may manually input the desired monetary amount of wireless service to be procured into a graphical user interface of the wireless service application 155. The wireless service application 155 connecting to the wireless backend system 322 through a user account portal. This monetary amount of wireless service may then be transmitted to the wireless backend system 322. In this aspect, the wireless user 312 may manually input, and the like the desired distribution of wireless service to be procured. In particular, what amount of voice call service, data service, text messaging service, and/or service days. Thereafter, the wireless backend system 322 may update the prepaid account of the wireless user 312 consistent with the amount of wireless service obtained and the particular distribution of wireless services.

Figure 3:
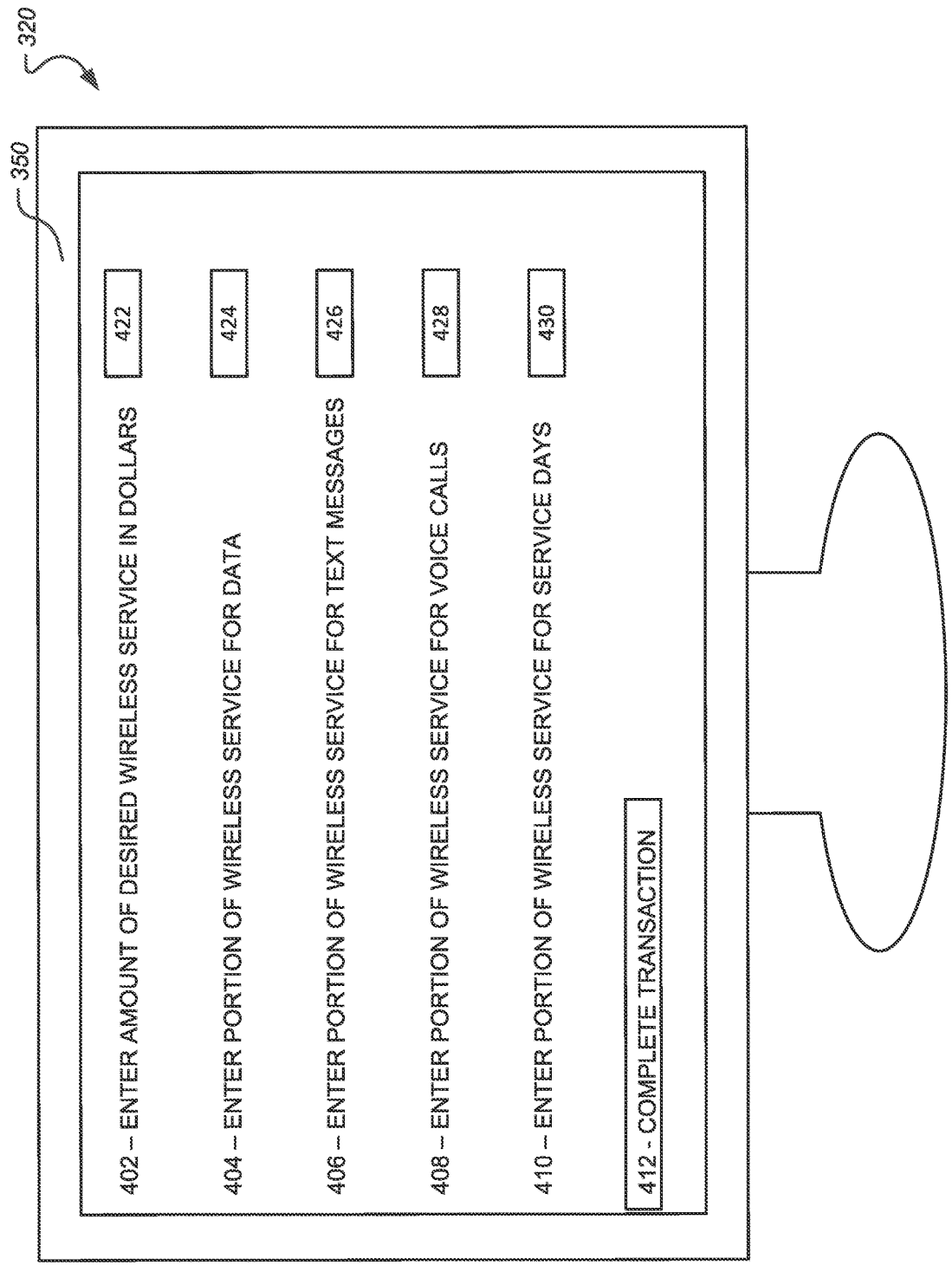
FIG. 3 illustrates an exemplary graphical user interface of a point-of-sale terminal according to aspects of the system of the disclosure.

FIG. 3 illustrates an exemplary graphical user interface of a point-of-sale terminal according to aspects of the system of the disclosure.

In particular, FIG. 3 illustrates an exemplary display 350 of a point-of-sale terminal. In one aspect, the display 350 of the point-of-sale terminal may generate a graphical user interface that includes a query to enter an amount of desired wireless service in dollars 402 along with an input 422 to receive the amount. In one aspect, the display 350 of the point-of-sale terminal may generate a graphical user interface that includes a query to enter a portion of wireless service for data 404 along with an input 424 to receive the amount. In one aspect, the display 350 of the point-of-sale terminal may generate a graphical user interface that includes a query to enter a portion of wireless service for text messages 406 along with an input 426 to receive the amount. In one aspect, the display 350 of the point-of-sale terminal may generate a graphical user interface that includes a query to enter a portion of wireless service for voice calls 408 along with an input 428 to receive the amount. In one aspect, the display 350 of the point-of-sale terminal may generate a graphical user interface that includes a query to enter a portion of wireless service for service days 410 along with an input 430 to receive the amount. In one aspect, the display 350 of the point-of-sale terminal may generate a graphical user interface that includes an input to complete the transaction 412. The inputs 424, 426, 428, 430 illustrated and described with respect to FIGS. 3, 4, and 5 may operate in real time to ensure that the user cannot input any more of the various different wireless service types then they have purchased or are contemplating purchasing. The inputs 424, 426, 428, 430 may be implemented in any known manner including the ability to input percentages, actual values, move slide bars, and the like.

Figure 4:
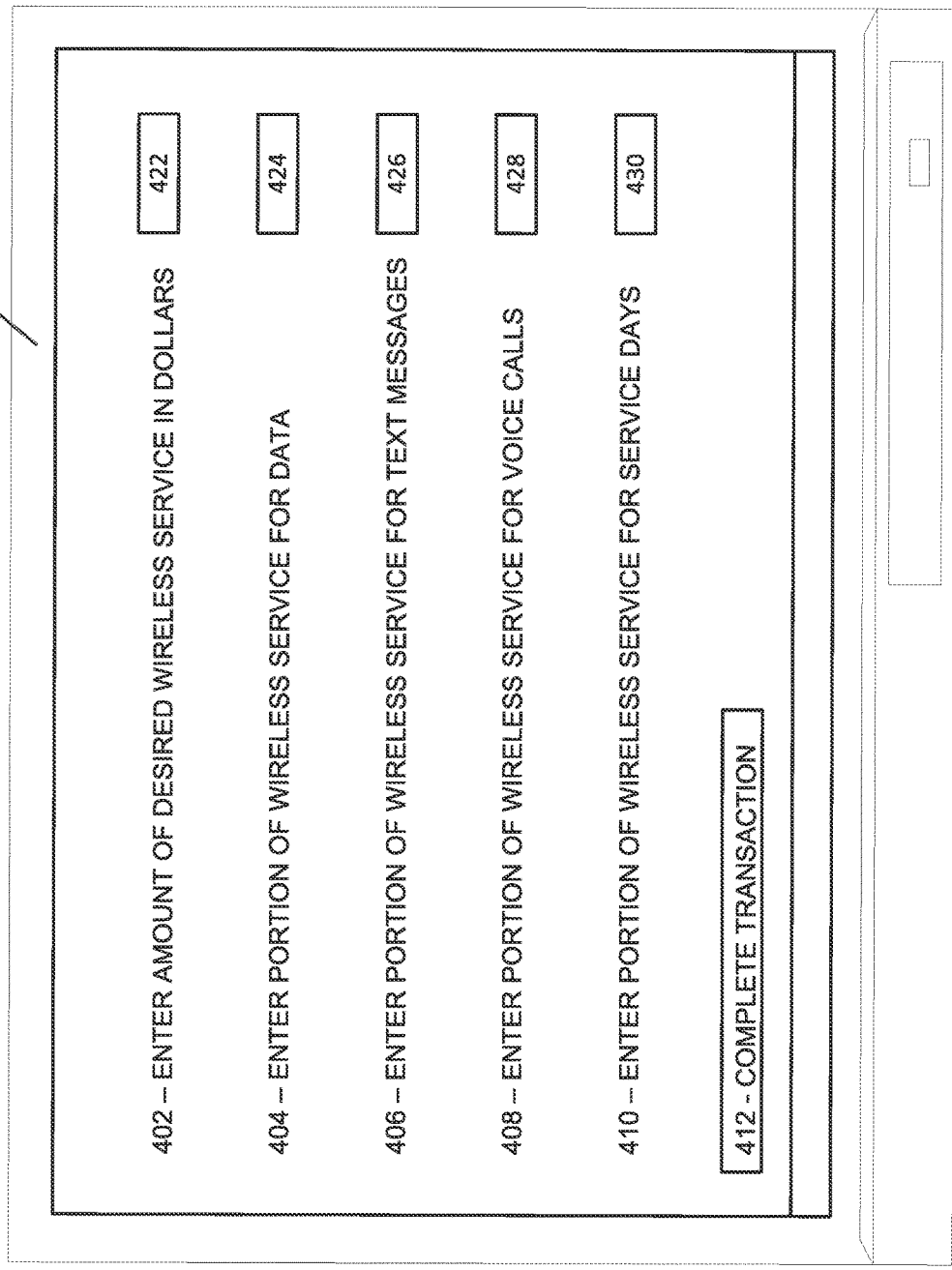
FIG. 4 illustrates an exemplary graphical user interface of an Internet-enabled device according to aspects of the system of the disclosure.

FIG. 4 illustrates an exemplary graphical user interface of an Internet-enabled device according to aspects of the system of the disclosure.

In particular, FIG. 4 illustrates an exemplary display 400 of the wireless device 104 or internet-enabled device 326. In one aspect, the display 400 may generate a graphical user interface that includes a query to enter an amount of desired wireless service in dollars 402 along with an input 422 to receive the amount. In one aspect, the display 400 may generate a graphical user interface that includes a query to enter a portion of wireless service for data 404 along with an input 424 to receive the amount. In one aspect, the display 400 may generate a graphical user interface that includes a query to enter a portion of wireless service for text messages 406 along with an input 426 to receive the amount. In one aspect, the display 400 may generate a graphical user interface that includes a query to enter a portion of wireless service for voice calls 408 along with an input 428 to receive the amount. In one aspect, the display 400 may generate a graphical user interface that includes a query to enter a portion of wireless service for service days 410 along with an input 430 to receive the amount. In one aspect, the display 400 may generate a graphical user interface that includes an input to complete the transaction 412.

Figure 5:
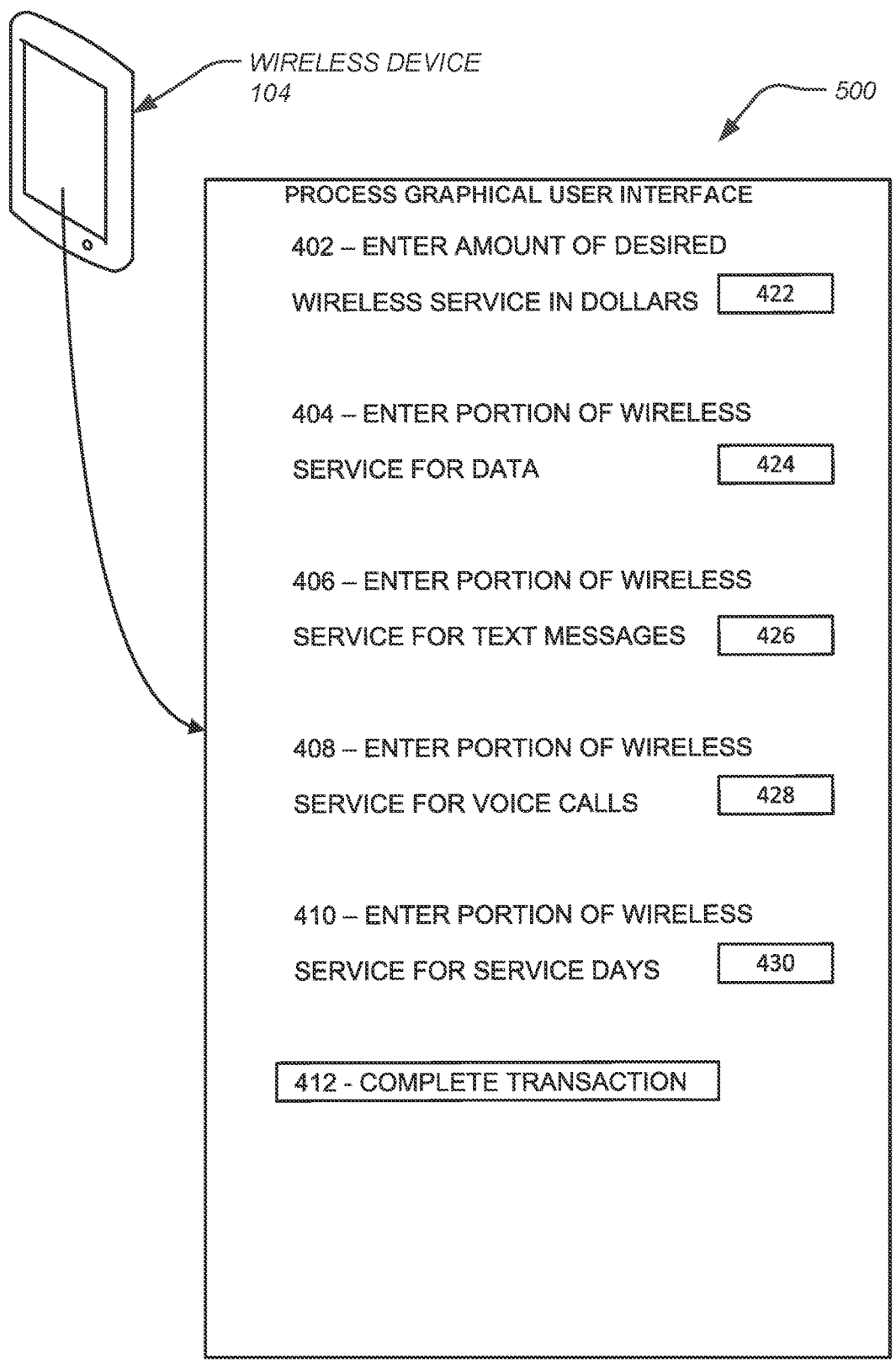
FIG. 5 illustrates an exemplary graphical user interface of wireless device according to aspects of the system of the disclosure.

FIG. 5 illustrates an exemplary graphical user interface of wireless device according to aspects of the system of the disclosure.

In particular, FIG. 5 illustrates an exemplary display 500 of the wireless device 104 implementing the wireless service application 155. In one aspect, the display 500 may generate a graphical user interface that includes a query to enter an amount of desired wireless service in dollars 402 along with an input 422 to receive the amount. In one aspect, the display 500 may generate a graphical user interface that includes a query to enter a portion of wireless service for data 404 along with an input 424 to receive the amount. In one aspect, the display 500 may generate a graphical user interface that includes a query to enter a portion of wireless service for text messages 406 along with an input 426 to receive the amount. In one aspect, the display 500 may generate a graphical user interface that includes a query to enter a portion of wireless service for voice calls 408 along with an input 428 to receive the amount. In one aspect, the display 500 may generate a graphical user interface that includes a query to enter a portion of wireless service for service days 410 along with an input 430 to receive the amount. In one aspect, the display 500 may generate a graphical user interface that includes an input to complete the transaction 412.

The wireless service selection and wireless device-related information may be transferred to a wireless backend system 322. The wireless device-related information can include, for example, the International Mobile Equipment Identify ("IMEI"), an Electronic Serial Number (ESN), Mobile Equipment Identifier (MEID), and/or a serial number for a subscriber identity module (SIM) card installed in the wireless device 104. The SIM card may include a SIM card memory for storing at least a SIM card serial number, for example, an Integrated Circuit Card ID (ICCID). A wireless device not utilizing a SIM card is contemplated as well for use with the disclosure.

In some aspects, the information transferred may be in the form of an activation message that corresponds and/or includes the wireless provider and/or wireless service selection by the wireless user 312 and automatically retrieved wireless device related information, the wireless device 104 unique identifier, and/or payment information, payment authorization information, payment verification information, and the like. The activation message including the automatically retrieved information can be generated by a processor including, for example, the processor of the wireless device 104, internet-enabled device 326, and/or a processor at the point-of-sale terminal 320. In some aspects, the activation message may be transmitted over a provisioning channel provided by a wireless carrier network 316 that is available to inactive or unprovisioned wireless devices or via any type of conventional activation protocols known in the art on a communication channel as defined herein. Alternatively, the activation message can be transmitted from the point-of-sale terminal 320 via any wired or other wireless communication type to the wireless backend system 322. The wireless backend system 322 can include one or more servers, one or more databases 324, and the like wherein authorized unique identifiers of a wireless device 104 may be correlated, recorded, tracked, and the like when a wireless service is purchased, redeemed, and/or the like.

Although it is not required in some aspects, the provisioning wireless carrier network 316 may be used to receive the activation message via a the provisioning channel and forward the activation message in real time to a subscriber provisioning wireless carrier network 316 operated by a service provider for the activation of one or more services for the wireless device 104. Accordingly, the services requested to be activated can include at least one of: an initial "out of the box" activation of wireless services of an unprovisioned wireless device 104 or device upgrades, device reactivations, wireless number changes, the addition or purchasing of services including airtime, enrollments or content, and wireless number porting for wireless devices that have previously been activated or provisioned. In some aspects, the provisioning wireless carrier network 316 can be connected to a wireless carrier server and forward the activation message to the subscriber provisioning wireless carrier network 316, either directly or through a destination server connected to the subscriber provisioning wireless carrier network 316, to initiate service activation and provisioning of the wireless device 104.

Figure 6:
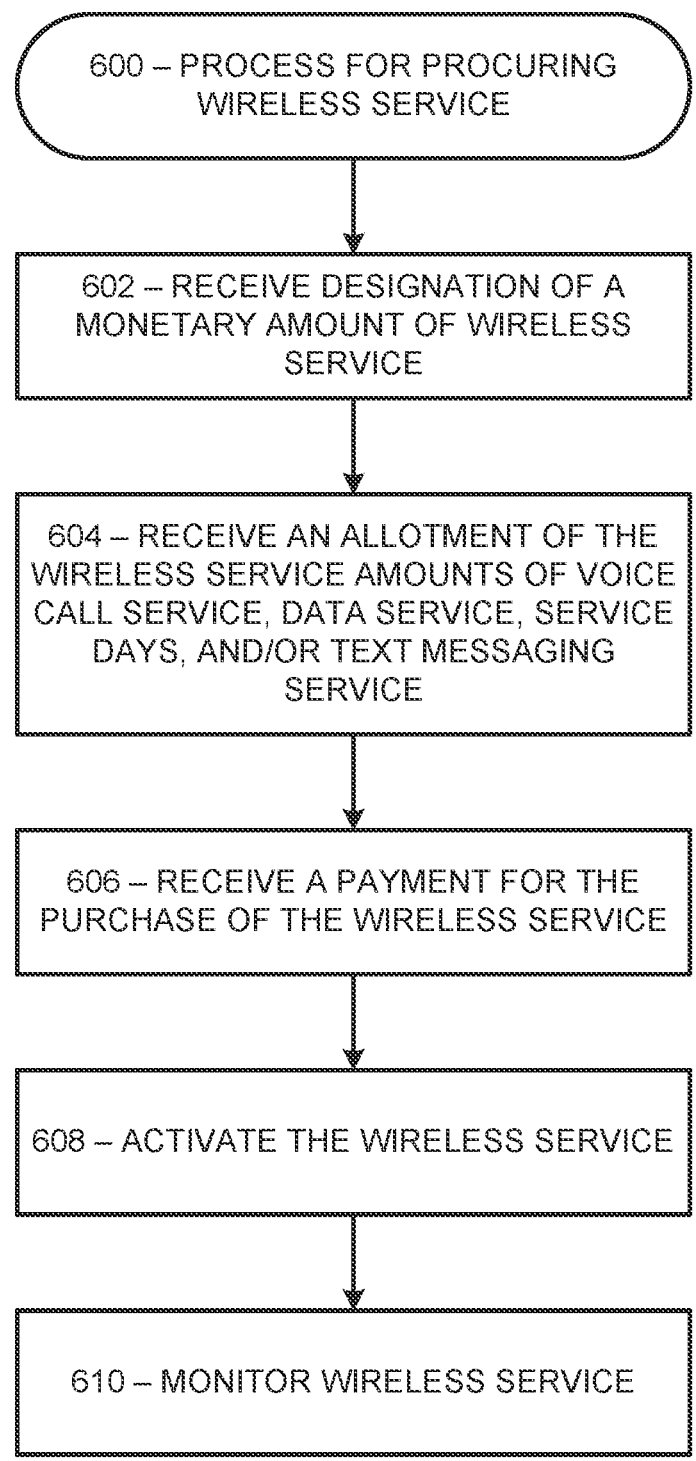
FIG. 6 illustrates an exemplary process that may be used to implement the system of the disclosure.

FIG. 6 illustrates an exemplary process that may be used to implement the system of the disclosure.

Referring now to FIG. 6, a process 600 with exemplary process steps may be used for procuring wireless service at the point-of-sale terminal 320, the wireless service application 155 implemented on the wireless device 104, the browser implemented on the wireless device 104, and/or the browser of the Internet-enabled device 326 (connected devices) according to aspects of the disclosure. In particular, the process steps may be performed by a point-of-sale computer, the wireless device 104, the Internet-enabled device 326, and the like to facilitate procuring the wireless service.

As illustrated in box 602, the process 600 may receive a designation of a monetary amount of wireless service. As illustrated in box 604 the process may also receive an allotment of the wireless service amounts of voice call service, data service, service days, and/or text messaging service. In one aspect, an initial allotment of the wireless service amounts of voice call service, data service, service days, and/or text messaging service may be generated in accordance with the monetary amount of wireless service. In this regard, if the wireless user is satisfied with this allotment, no further action is needed to change the allotment of wireless service.

In aspects relating to the point-of-sale terminal 320, the monetary amount of wireless service and the allotment the wireless service amounts of voice call service, data service, service days and/or text messaging service are entered into the point-of-sale terminal 320. In aspects relating to the wireless service application 155 implemented on the wireless device 104, the monetary amount of wireless service and the allotment the wireless service amounts of voice call service, data service, service days, and/or text messaging service are entered into a graphical user interface of the wireless service application 155 implemented on the wireless device 104. In aspects relating to the Internet-enabled device 326, the monetary amount of wireless service and the allotment the wireless service amounts of voice call service, data service, service days, and/or text messaging service are entered into a graphical user interface of a browser associated with the Internet-enabled device 326.

In some aspects, the determination of the allotment the wireless service amounts of voice call service, data service, service and/or text messaging service based on the monetary amount of wireless service may be determined by a lookup table, an algorithm, or the like. In this regard, the allotment the wireless service amounts of voice call service, data service, service days, and/or text messaging service based on the monetary amount of wireless service may be determined by an algorithm. For example, X dollars of wireless service equals A dollars of voice call service, B dollars of data service, C dollars of service days and/or D dollars of text messaging service. Where X=A+B+C+D. In other words, if the user desires voice call service, then the user will receive less data service, service days and/or text messaging service for example. The algorithm can operate in real time during the allotment of wireless service. For example, five dollars of wireless service equals two dollars of voice call service, one dollar of data service, one dollar of service days, and one dollar of text messaging service. As another example, five dollars of wireless service equals one dollar of voice call service, two dollars of data service, one dollar of service days, and one dollar of text messaging service. There are of course a great number of different wireless service allotments that a wireless user 312 can request. The algorithm can operate in real time such that if the user purchases five dollars of wireless service and designates five dollars for data service, the user cannot designate any of voice service, service days, or text messaging service. In other words, they have allocated all of the five dollars to data service.

In another aspect, the algorithm may include an overhead cost, exchange factor, and/or exchange rate. For example, X dollars of wireless service equals A dollars of voice call service, B dollars of data service, C dollars of service days, D dollars of text messaging service, and an exchange rate F. Where X=A+B+C+D+F. in one aspect, the exchange rate F may be a flat cost (i.e., one dollar). For example, five dollars of wireless service equals one dollar of voice call service, one dollar of data service, one dollar of service days, one dollar of text messaging service, and one dollar of overhead. In other aspects, the exchange rate F may be a sliding rate. If implemented as a sliding rate, the lighting rate may equal (X−G)*F, where G is a desired breakeven value. Thus, the wireless user realizes a payment of overhead when the wireless service purchased is less than G and realizes a benefit when the wireless service purchased is greater than G. The resulting algorithm would then be X=A+B+C+D+(X−G)*F.

In another aspect, in step 602 the wireless user 312 designates only a monetary amount of wireless service. The allotment of the wireless service amounts of voice call service, data service, or text messaging service may be designated at a later date and/or time. In other words, the process 604 may be implemented at a later date or time.

At step 606, a payment transaction for the purchase of the wireless service may be completed. In aspects relating to the point-of-sale terminal 320, the payment transaction may be made through the point-of-sale terminal 320. In aspects relating to the wireless service application 155, the payment transaction may be made through the graphical user interface of the wireless service application 155 implemented on the wireless device 104. In aspects relating to the Internet-enabled device 326, the payment transaction may be made through the graphical user interface of a browser associated with the Internet-enabled device 326. Payment may include credit card payment, debit card payment, cash payment, electronic check, check, payment applications, and the like. Payment applications can include but are not limited to, for example, Google Wallet™, PayPal™, Amazon Payments™, and the like. Accordingly, the payment processing can receive payment through a salesperson, a payment application, or the like.

As illustrated in box 608, the wireless backend system 322 may receive the designated monetary amount of wireless service and optionally the allotment of the wireless service amounts of voice call service, data service, service days, and/or text messaging service. The monetary amount of wireless service and allotment of the wireless service amounts of voice call service, data service, service days, and/or text messaging service may be associated with a unique identifier and stored in a database of the wireless backend system 322. The unique identifier may be associated with an airtime card, airtime code, or the like that may be provided to the wireless user 312, the unique identifier may be personal identification number (PIN).

At step 608, the wireless user 312 may elect to activate the wireless service at the time of purchase or save the activation code for future use. In one aspect, the unique identifier code along with wireless device 104 information are transmitted to and received by the wireless backend system 322 as described above. The wireless backend system 322 may verify the unique identification code by searching for the unique identification code in one or more databases to ensure the unique identification code has not been recorded/redeemed previously. If the wireless backend system 322 finds the unique identification code is not approved, the activation of the wireless service will be stopped. Upon stopping the activation of the wireless service, the wireless backend system 322 may send a warning message to the wireless user 312 (e.g., using the wireless device 104) and/or the wireless provider.

Alternatively, if the unique identification code is approved (authentic, not been previously used, or the like) by the wireless backend system 322, authorization of a wireless service, including an update of the user's prepaid account, may take place. In this regard, the authorized unique identification code may be recorded in a database of the wireless backend system 322 before, after, or during, the activation of the wireless service on the wireless device 104 takes place. In other aspects, the authorization of wireless service may be completed without utilizing a unique identifier.

As illustrated in box 610, the use of the wireless service activated may be monitored to determine when the corresponding wireless service has been expended by the wireless user 312. The wireless services being monitored by the metering system as described above.

Figure 7:
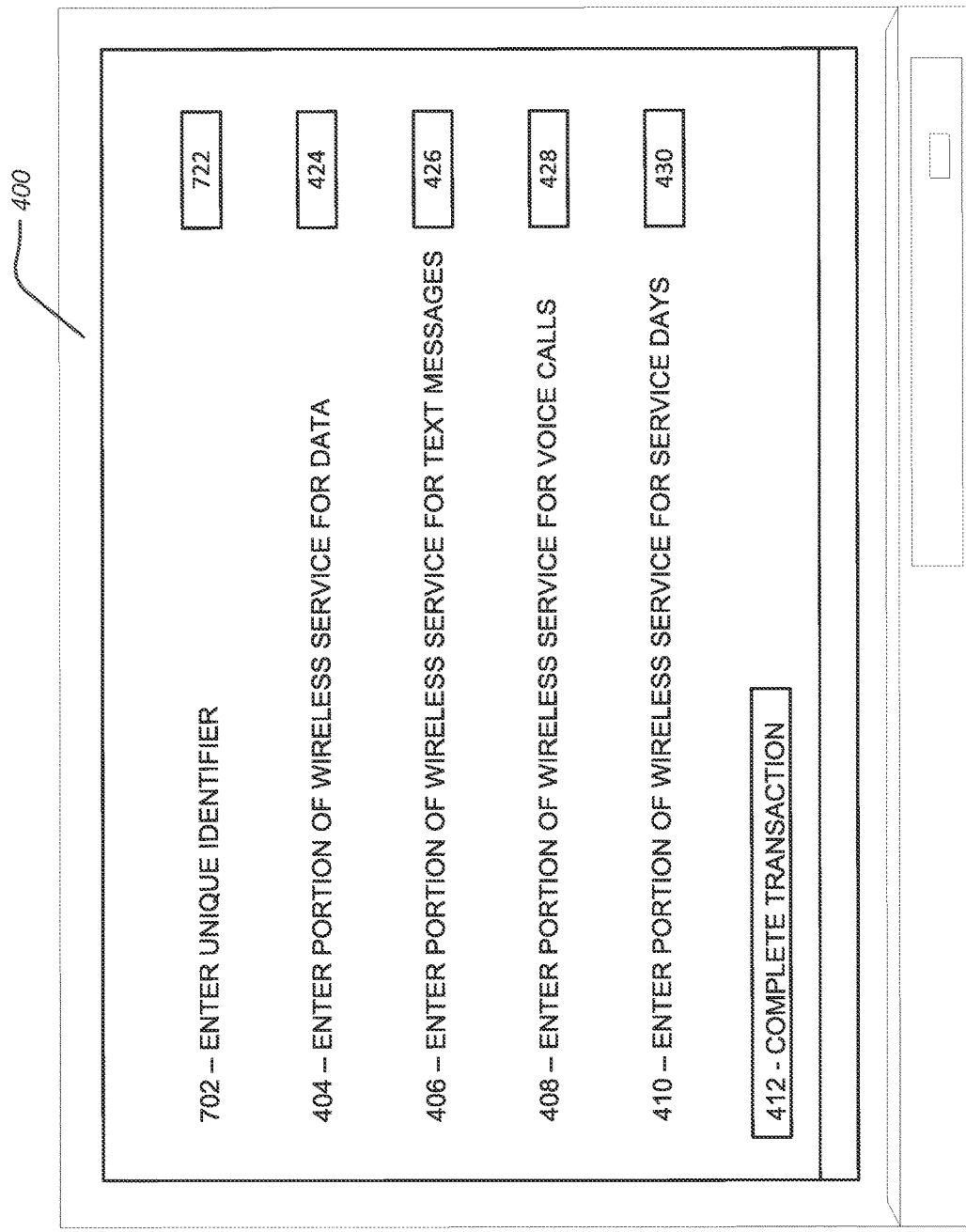
FIG. 7 illustrates an exemplary graphical user interface of an Internet-enabled device according to aspects of the system of the disclosure.

FIG. 7 illustrates an exemplary graphical user interface of an Internet-enabled device according to aspects of the system of the disclosure.

In this regard, FIG. 7 illustrates a scenario where a user 312 has obtained an airtime code and/or airtime card as described above and desires to utilize the associated unique identifier to add wireless service to their prepaid wireless service account. In particular, FIG. 7 illustrates an exemplary display 400 of the wireless device 104 or internet-enabled device 326. In one aspect, the display 400 may generate a graphical user interface that includes a query to enter a unique identifier of the purchased wireless service 702 along with an input 722 to receive the unique identifier. In another aspect, the wireless user 312 may alternatively desire to change their present wireless service allotment (data, voice, text, and service days) to another desired allotment of wireless service. In this aspect, the query 702 may not be generated and/or alternatively the input 722 may be left blank in order to implement this aspect.

In one aspect, the display 400 may generate a graphical user interface that includes a query to enter a portion of wireless service for data 404 along with an input 424 to receive the amount. In one aspect, the display 400 may generate a graphical user interface that includes a query to enter a portion of wireless service for text messages 406 along with an input 426 to receive the amount. In one aspect, the display 400 may generate a graphical user interface that includes a query to enter a portion of wireless service for voice calls 408 along with an input 428 to receive the amount. In one aspect, the display 400 may generate a graphical user interface that includes a query to enter a portion of wireless service for service days 410 along with an input 430 to receive the amount. In one aspect, the display 400 may generate a graphical user interface that includes an input to complete the transaction 412.

Figure 8:
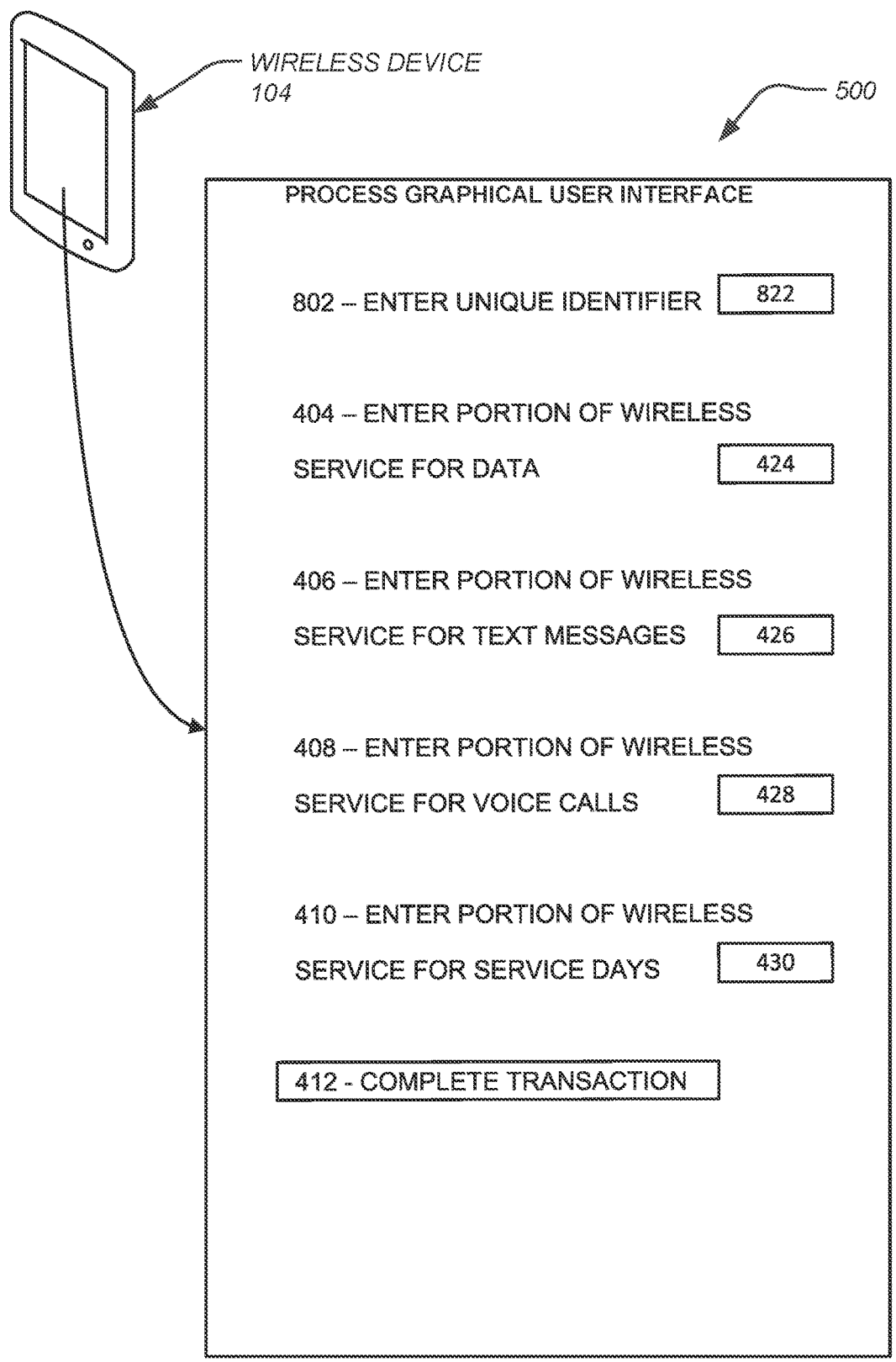
FIG. 8 illustrates an exemplary graphical user interface of wireless device according to aspects of the system of the disclosure.

FIG. 8 illustrates an exemplary graphical user interface of wireless device according to aspects of the system of the disclosure.

In this regard, FIG. 8 illustrates a scenario where a user 312 has obtained an airtime code and/or airtime card and desires to utilize the associated unique identifier to add wireless service to their prepaid wireless service account. In particular, FIG. 8 illustrates an exemplary display 500 of the wireless device 104 implementing the wireless service application 155. In one aspect, the display 500 may generate a graphical user interface that includes a query to enter the unique identifier 802 along with an input 822 to receive the unique identifier. In another aspect, the wireless user 312 may alternatively desire to change their present wireless service allotment (data, voice, text, and service days) to another desired allotment of wireless service. In this aspect, the query 802 may not be generated and/or alternatively the input 822 may be left blank in order to implement this aspect.

In one aspect, the display 500 may generate a graphical user interface that includes a query to enter a portion of wireless service for data 404 along with an input 424 to receive the amount. In one aspect, the display 500 may generate a graphical user interface that includes a query to enter a portion of wireless service for text messages 406 along with an input 426 to receive the amount. In one aspect, the display 500 may generate a graphical user interface that includes a query to enter a portion of wireless service for voice calls 408 along with an input 428 to receive the amount. In one aspect, the display 500 may generate a graphical user interface that includes a query to enter a portion of wireless service for service days 410 along with an input 430 to receive the amount. In one aspect, the display 500 may generate a graphical user interface that includes an input to complete the transaction 412.

Accordingly, a more convenient flexible approach has been disclosed for the sale and procuring of wireless services. In this regard, the wireless user may be able to designate an amount of wireless service desired in any amount. In other aspects, the wireless user may be able to designate an amount of wireless service desired in increments of dollars (e.g., $1, $2, $3 . . . $100). Moreover, the wireless user 312 may be able to designate what portion of the procured wireless service is allocated for voice call service, data service, text messaging service, service days, and the like. This approach gives the wireless user 312 great flexibility to obtain the desired wireless service consistent with their budget, needs, and so on.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be beneficial due to the ubiquity of web browsers and the convenience of using a web browser as a client (i.e., thin client). Further, with inherent support for cross-platform compatibility, the web application may be maintained and updated without distributing and installing software on each.

The web portal may be a specially designed website that brings information from diverse sources. In some aspects, each information source gets a dedicated area on the page for displaying information (a portlet). In some aspects, the portal may include mashups and intranet "dashboards." The portal may use an application programming interface (API). The portal may provide a way for enterprises and organizations with access control, modification, procedures, and the like for multiple applications and databases. The features available may be restricted to an authorized and authenticated user (employee, member).

The term text messaging service, text message, or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, and 5G networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While a popular use is to send photographs from camera-equipped handsets, it is also used as a method of delivering news and entertainment content including videos, pictures, text pages, and ringtones. MMS can be used within the context of the present invention for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term voice call service, voice, or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data service or data as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), 5G (fifth generation), W-CDMA (Wideband Code-Division Multiple Access), Wireless Fidelity (WI-FI™), BLUETOOTH™, Near field communication (NFC), and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™

Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

For the purposes of this disclosure a computer readable medium stores computer data, which data can include computer program code that is executable by a processor in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm, or module may reside as one or any combination or set of codes and/or instructions on a computer readable medium or machine readable medium, which may be incorporated into a computer program product.

As used herein interactive voice response (IVR) is a technology that allows a computer to interact with humans through the use of voice and DTMF tones input via keypad. In telecommunications, IVR allows customers to interact with a host system via a telephone keypad or by voice recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions.

Voice recognition software may be utilized in various aspects of the systems and methods. Users may be able to vocalize, rather than utilizing other input processes. For example, the voice recognition software may be configured for generating text from voice input from a microphone or other voice input. A speech signal processor may convert speech signals into digital data that can be processed by the processor. The processor may perform several distinct functions, including serving as the speech event analyzer, the dictation event subsystem, the text event subsystem, and the executor of the application program. The speech signal processor may generate speech event data and transmit this data to the processor to be processed first by the speech event analyzer. The speech event analyzer may generate a list or set of possible candidates among the system recordings that represent or match the voice input processed by the speech signal processor. The speech event analyzer may transmit the candidate sets to a dictation event subsystem. The dictation event subsystem may analyze the candidate sets and choose the best match candidate with the highest degree of similarity. This candidate is then considered the correct translation, and the dictation event subsystem forwards the translation to the text event subsystem, which in turn inputs the translated text into the device.

The many features and advantages of the disclosure are apparent from the detailed specification, and, thus, it is intended by the appended claims to cover all such features and advantages of the disclosure that fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A wireless service provider system configured to provision wireless service for a wireless device, the wireless service provider system comprising:
   a backend computer system configured to communicate with a connected device over a network;
   the backend computer system further configured to receive an authorization or verification of a payment for activating an incremental amount of one of a data service, text service, voice service, or service days, wherein each of the services is a wireless service that is offered to the connected device, the incremental amount being less than a preset amount of the respective wireless service previously purchased for the connected device;
   the backend computer system further configured to receive a request from the connected device to allocate the incremental amount;
   the backend computer system further configured to provision the requested allocation through a wireless service provider to the connected device; and
   a metering computer system configured to (i) determine whether the provisioned amount is used based on one of a plurality of different charge rates that is identified for the respective wireless service and (ii) deactivate the provisioned wireless service based on the determination,
   wherein the connected device comprises at least one of the following: a point-of-sale terminal, the wireless device, or an Internet-enabled device.

2. The wireless service provider system of claim 1, wherein the connected device comprises the wireless device comprising a display, a processor, and a transceiver; and
   wherein the backend computer system is further configured to receive the request through an application executed in the processor of the wireless device.

3. The wireless service provider system of claim 2, wherein the backend computer system is further configured to receive the payment authorization or the verification of the payment for the wireless service in the requested amount from the wireless device through the application executed in the processor of the wireless device.

4. The wireless service provider system of claim 3, wherein the backend computer system is further configured to receive the request through the application executed in the processor of the wireless device.

5. The wireless service provider system of claim 1, wherein the connected device comprises the Internet-enabled device comprising a display, a processor, and a transceiver; and
   wherein the backend computer system is further configured to receive the request from the Internet-enabled device through an application executed in the processor of the Internet-enabled device.

6. The wireless service provider system of claim 5, wherein the backend computer system is further configured to receive the payment authorization or the verification of the payment from the Internet-enabled device through the application executed in the processor of the Internet-enabled device; and
   wherein the backend computer system is further configured to receive the request from the wireless device from the Internet-enabled device through the application executed in the processor of the Internet-enabled device.

7. The wireless service provider system of claim 1, wherein the connected device comprises the point-of-sale terminal;
   wherein the backend computer system is further configured to receive the request in any amount from the point-of-sale terminal;
   wherein the backend computer system is further configured to store a unique identifier of the respective wireless service in conjunction with the payment authorization or the verification of the payment; and
   wherein the backend computer system is further configured to provision the wireless service upon a verification of the unique identifier received from the connected device.

8. The wireless service provider system of claim 7, wherein the backend computer system is further configured to receive the payment authorization or the verification of the payment from the point-of-sale terminal.

9. The wireless service provider system of claim 8, wherein the backend computer system is further configured to receive the request from the wireless device through an application executed in a processor of the wireless device.

10. The wireless service provider system of claim 9, wherein the backend computer system is further configured to receive the request through the point-of-sale terminal.

11. A wireless service provider process for authorizing wireless service on a wireless device, the process comprising:
    providing a backend system configured to communicate with a connected device;
    receiving in the backend system an authorization or verification of a payment for activating an incremental amount of one of a data service, text service, voice service, or service days, wherein each of the services is a wireless service that is offered to the connected device, the incremental amount being less than a preset amount of the respective wireless service previously purchased for the connected device;
    receiving in the backend system a request from the connected device to allocate the incremental amount;
    provisioning with the backend system the requested allocation through a wireless service provider to the connected device;
    determining whether the provisioned amount is used based on one of a plurality of different charge rates that is identified for the respective wireless service; and
    deactivating with a metering system the provisioned wireless service based on the determination,
    wherein the connected device comprises at least one of the following: a point-of-sale terminal, the wireless device, or an Internet-enabled device.

12. The wireless service provider process of claim 11, wherein the connected device comprises the wireless device comprising a display, a processor, and a transceiver; and
    wherein the backend system is further configured to receive the request through an application executed in the processor of the wireless device.

13. The wireless service provider process of claim 12, wherein the backend system is further configured to receive the payment authorization or the verification of the payment for the wireless service in the requested amount from the wireless device through the application executed in the processor of the wireless device.

14. The wireless service provider process of claim 13, wherein the backend system is further configured to receive the request through the application executed in the processor of the wireless device.

15. The wireless service provider process of claim 11, wherein the connected device comprises the Internet-enabled device comprising a display, a processor, and a transceiver; and
> wherein the backend system is further configured to receive the request from the Internet-enabled device through an application executed in the processor of the Internet-enabled device.

16. The wireless service provider process of claim 15, wherein the backend system is further configured to receive the payment authorization or the verification of the payment from the Internet-enabled device through the application executed in the processor of the Internet-enabled device; and
> wherein the backend system is further configured to receive the request from the wireless device from the Internet-enabled device through the application executed in the processor of the Internet-enabled device.

17. The wireless service provider process of claim 11, wherein the connected device comprises the point-of-sale terminal;
> wherein the backend system is further configured to receive the request in any amount from the point-of-sale terminal;
> wherein the backend system is further configured to store a unique identifier of the respective wireless service in conjunction with the payment authorization or the verification of the payment; and
> wherein the backend system is further configured to provision the wireless service upon a verification of the unique identifier received from the connected device.

18. The wireless service provider process of claim 17, wherein the backend system is further configured to receive the payment authorization or the verification of the payment from the point-of-sale terminal.

19. The wireless service provider process of claim 18, wherein the backend system is further configured to receive the request from the wireless device through an application executed in a processor of the wireless device.

20. The wireless service provider process of claim 19, wherein the backend system is further configured to receive the request through the point-of-sale terminal.

* * * * *